(12) United States Patent
Medapalli (10) Patent No.: US 9,929,849 B2
(45) Date of Patent: *Mar. 27, 2018

(54) METHOD AND SYSTEM FOR A TIME DOMAIN APPROACH TO 4G/LTE-WIFI/BT COEXISTENCE

(71) Applicant: Avago Technologies General IP (Singapore) Pte. Ltd., Singapore (SG)

(72) Inventor: Kameswara Rao Medapalli, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,861

(22) Filed: Mar. 30, 2015

(65) Prior Publication Data

US 2015/0207610 A1 Jul. 23, 2015

Related U.S. Application Data (63) Continuation of application No. 13/959,282, filed on Aug. 5, 2013, now Pat. No. 8,995,321, which is a
(Continued)

(51) Int. Cl.
*H04B 7/00* (2006.01)
*H04L 5/00* (2006.01)
(Continued)

(52) U.S. Cl.
CPC .......... *H04L 5/0062* (2013.01); *H04L 5/0092* (2013.01); *H04W 72/0446* (2013.01); *H04W 72/1215* (2013.01)

(58) Field of Classification Search
CPC .......................... H04L 5/0092; H04W 72/1215
(Continued)

(56) References Cited

U.S. PATENT DOCUMENTS 7,430,400 B2    9/2008 Russo et al.
7,885,210 B2 *  2/2011 Yang ..................... H04W 48/12
                                                   370/278
(Continued)

FOREIGN PATENT DOCUMENTS

KR    10-2009-0060050 A    6/2009
WO    WO 2009/042469 A1    4/2009

OTHER PUBLICATIONS

International Search Report for International Patent Application No. PCT/US2011/024262, Commissioner for Patents, United States, dated Oct. 28, 2011.
(Continued)

*Primary Examiner* — Dmitry H Levitan
(74) *Attorney, Agent, or Firm* — Sterne, Kessler, Goldstein & Fox P.L.L.C.

(57) ABSTRACT

A method and system are provided in which a device that is operable to handle WiFi communication and WiMAX communication may receive downlink medium access protocol (MAP) information in a downlink sub-frame of a WiMAX frame and disable WiFi transmission during a portion of the downlink sub-frame based on the downlink MAP information. The disabled WiFi transmission may be enabled after data within the downlink sub-frame is decoded. The device may also receive uplink MAP information in the downlink sub-frame and may control a clear channel assessment associated with the WiFi transmission based on the uplink MAP information. The MAP information may comprise data or burst profile information and/or one or more physical control messages. A similar time domain approach may be utilized for coexistence between WiFi and long term evolution (LTE) coexistence, Bluetooth and WiMAX, and Bluetooth and LTE. Frame aggregation may be enabled to alleviate pending WiFi traffic.

18 Claims, 10 Drawing Sheets

Related U.S. Application Data continuation of application No. 13/024,124, filed on Feb. 9, 2011, now abandoned.

(60) Provisional application No. 61/308,250, filed on Feb. 25, 2010.

(51) Int. Cl.
  *H04W 72/12* (2009.01)
  *H04W 72/04* (2009.01)

(58) Field of Classification Search
  USPC ....... 370/310, 315, 328–330, 431, 437, 464, 370/465; 455/7, 8, 448, 452, 73, 78
  See application file for complete search history.

(56) References Cited

U.S. PATENT DOCUMENTS

| | | | |
|---|---|---|---|
| 7,929,912 B2 | 4/2011 | Sherman | |
| 8,045,922 B2 | 10/2011 | Sherman et al. | |
| 8,121,144 B2 | 2/2012 | Bitran | |
| 8,134,232 B2 | 3/2012 | Lohr et al. | |
| 8,155,695 B2 | 4/2012 | Wang et al. | |
| 8,160,001 B2 | 4/2012 | Bitran | |
| 8,175,015 B1 | 5/2012 | Chowdhuri et al. | |
| 8,204,036 B2 * | 6/2012 | Russell | H04W 88/06 370/350 |
| 8,315,234 B2 | 11/2012 | Sohrabi | |
| 9,048,932 B2 * | 6/2015 | Russell | H04B 1/525 |
| 2006/0217071 A1 | 9/2006 | Russo et al. | |
| 2009/0003303 A1 | 1/2009 | Zhu et al. | |
| 2009/0004972 A1 | 1/2009 | Wang et al. | |
| 2009/0129367 A1 | 5/2009 | Bitran | |
| 2009/0213804 A1 | 8/2009 | Yoon et al. | |
| 2009/0225696 A1 | 9/2009 | Ramachandran et al. | |
| 2009/0250805 A1 | 10/2009 | Lohr et al. | |
| 2009/0262669 A1 | 10/2009 | Sanders | |
| 2010/0041399 A1 | 2/2010 | Kim et al. | |
| 2011/0205986 A1 | 8/2011 | Medapalli | |
| 2014/0029535 A1 | 1/2014 | Medapalli | |

OTHER PUBLICATIONS

The Written Opinion of the International Searching Authority for International Patent Application No. PCT/US2011/024262, Commissioner for Patents, United States, dated Oct. 28, 2011.

International Preliminary Report on Patentability for related International Application No. PCT/US2011/024262, The International Bureau of WIPO, Geneva, Switzerland, dated Sep. 7, 2012; 8 pages.

IEEE 802.16 Standard, Part 16, IEEE, 2004, p. 507.

English language abstract of KR 10-2009-060050 A, Thomson Innovation. http://www.thomsoninnovation.com, accessed Feb. 19, 2014, listed as document FP2 on the accompanying form PTO/SB/08A; 5 pages.

\* cited by examiner

METHOD AND SYSTEM FOR A TIME DOMAIN APPROACH TO 4G/LTE-WIFI/BT COEXISTENCE

CROSS-REFERENCE TO RELATED APPLICATIONS/INCORPORATION BY REFERENCE

This application is a continuation of U.S. application Ser. No. 13/959,282, filed Aug. 5, 2013, which is a continuation of U.S. application Ser. No. 13/024,124, filed Feb. 9, 2011, which claims priority to and makes reference to U.S. Provisional Patent Application Ser. No. 61/308,250 filed on Feb. 25, 2010, all of which are incorporated by reference herein in their entirety.

FIELD OF THE INVENTION

Certain embodiments of the invention relate to interference in communication systems. More specifically, certain embodiments of the invention relate to a method and system for a time domain approach to 4G WiMAX/LTE and WiFi/BT coexistence.

BACKGROUND OF THE INVENTION

Personal area networks (PANs), such as WiFi networks and Bluetooth (BT) networks, for example, and fourth generation (4G) networks, such as Worldwide Interoperability for Microwave Access (WiMAX) and Long Term Evolution (LTE), for example, have been gaining popularity because of the flexibility, convenience in connectivity, and/or high data throughput they provide. Devices that support both types of networks need to enable operation with limited and/or reduced interference.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a time domain approach to 4G WiMAX/LTE and WiFi/BT coexistence, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for a time domain approach to 4G WiMAX/LTE and WiFi/BT coexistence. Various embodiments of the invention provide a device that is operable to handle WiFi communication and WiMAX communication. Such device may receive downlink medium access protocol (MAP) information in a downlink sub-frame of a WiMAX frame and may disable WiFi transmission during a portion of the downlink sub-frame based on the received downlink MAP information. The disabled WiFi transmission may be enabled after data within the downlink sub-frame is decoded. The device may also receive uplink MAP information in the downlink sub-frame and may control a clear channel assessment (CCA) associated with the WiFi transmission based on the received uplink MAP information. The MAP information in the downlink sub-frame may comprise a profile of the data or burst information and/or one or more physical control messages associated with both sub-frames in the WiMAX frame. In an LTE system, the Packet Data Control Channel (PDCCH) and the Physical Uplink Control Channel (PUCCH) may be utilized to inform the terminal about downlink and uplink transmissions. A similar time domain approach may be utilized for WiFi and time-division duplex LTE (TDD-LTE) coexistence. In case of frequency-division duplex LTE (FDD-LTE), the approach is applicable to WiFi/BT coexistence with certain extensions as described below. Moreover, frame aggregation may be enabled to alleviate pending WiFi transmission traffic.

Figure 1A:
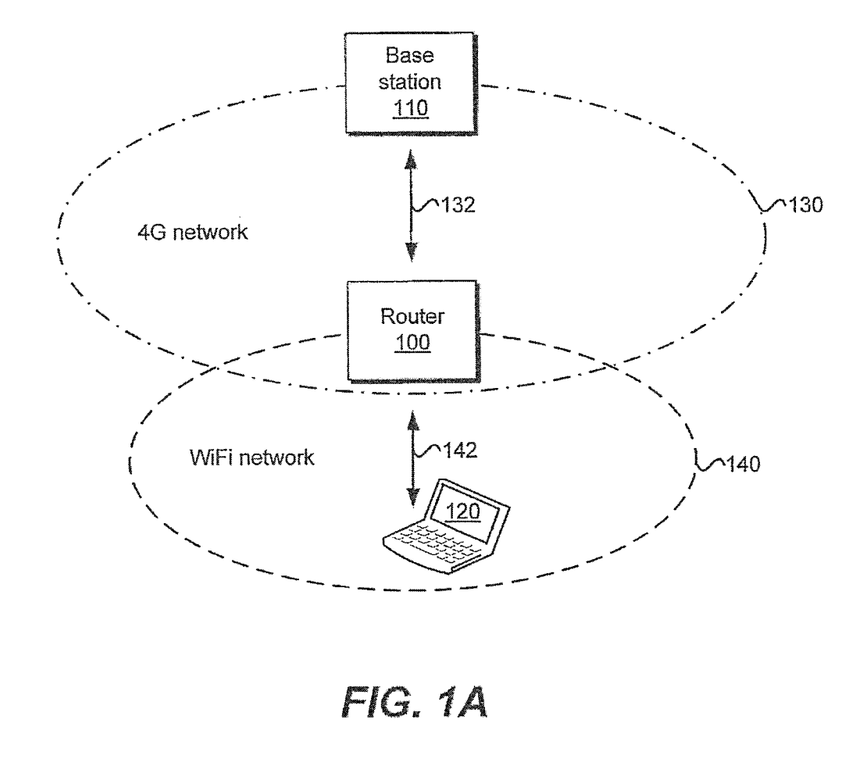
FIG. 1A is a diagram that illustrates an exemplary router that supports communication through a 4G network and a WiFi network, in accordance with an embodiment of the invention.

FIG. 1A is a diagram that illustrates an exemplary router that supports communication through a 4G network and a WiFi network, in accordance with an embodiment of the invention. Referring to FIG. 1A, there is shown a 4G network 130 and a WiFi network 140. In some embodiments of the invention, the 4G network 130 may be a WiMAX network such as a mobile WiMAX network or a Wireless-MAN-Advanced network, for example. In other embodiments of the invention, the 4G network 130 may be an LTE network, including advanced versions of LTE such as an LTE Advanced network, for example. The LTE network may operate as a TDD-LTE network or as an FDD-LTE network. In yet another embodiment of the invention, the 4G network 130 may support WiMAX communication and LTE communication at the same time.

A base station 110 and a router 100 are also shown as part of the 4G network 130. The base station 110 and the router 100 may communicate through a link 132 that enables 4G communication in a downlink direction and/or in an uplink direction. The router 100 and a user device 120 are shown as part of the WiFi network 140. The router 100 and the user device 120 may communicate through a link 142 that enables WiFi communication in a downlink direction and/or in an uplink direction.

The router 100 may be a mobile router, for example. The router 100 may comprise suitable logic, circuitry, interfaces and/or code that may be operable to limit and/or reduce the interference that may occur by having 4G and WiFi coexistent operations. The router 100 may be operable to communicate such that the reception of WiMAX or LTE signals from the base station 110 is not affected by the transmission of WiFi signals to the user device 120. In this regard, the router 100 may enable about a 25 dB isolation between the antenna(s) used for 4G communication and the antenna(s) used for WiFi communication. The router 100 may support other types of communication as well. For example, the router 100 may support communication through wireless local area networks that are based on the IEEE 802.11 standards, through other cellular wireless networks, and/or through personal area network technologies.

The user device 120 may comprise suitable logic, circuitry, interfaces and/or code that may be operable to support WiFi communication. Moreover, the user device 120 may support communication with one or more nearby devices (not shown) through personal area network technologies such as infrared data association (IrDA), Bluetooth, ultra-wideband (UWB), Z-Wave and ZigBee, for example. The user device 120 may be, for example, a smartphone, a laptop, a tablet, or other like mobile and/or portable computing device. The user device 120 may also be referred to as a station.

In operation, downlink traffic may flow from the base station 110 to the router 100 via the link 132 in the 4G network 130. The downlink traffic may then be communicated by the router 100 to the user device 120 via the link 142 in the WiFi network 140. In such an instance, since similar downlink traffic may flow in both networks, the downlink traffic in the 4G network 130 may be said to be correlated with the downlink traffic in the WiFi network 140.

Similarly, uplink traffic may flow from the user device 120 to the router 100 via the link 142 in the WiFi network 140. The uplink traffic may then be communicated by the router 100 to the base station 110 via the link 132 in the 4G network 130. In such an instance, since similar uplink traffic may flow in both networks, the uplink traffic in the WiFi network 140 may be said to be correlated with the uplink traffic in the 4G network 130.

In one embodiment of the invention, when the 4G network 130 is a WiMAX network and a single station is considered in the WiFi network 140, the WiMAX/WiFi downlink throughput may be able to support about 13 megabits-per-second (Mb/s) for Transmission Control Protocol (TCP) while the WiMAX/WiFi uplink throughput may be able to support about 4 Mb/s for TCP.

In another embodiment of the invention, when the 4G network 130 is an LTE network and a single station is considered in the WiFi network 140, the LTE/WiFi downlink throughput may be able to support about 50 Mb/s for TCP while the LTE/WiFi uplink throughput may be able to support about 10 Mb/s for TCP.

Figure 1B:
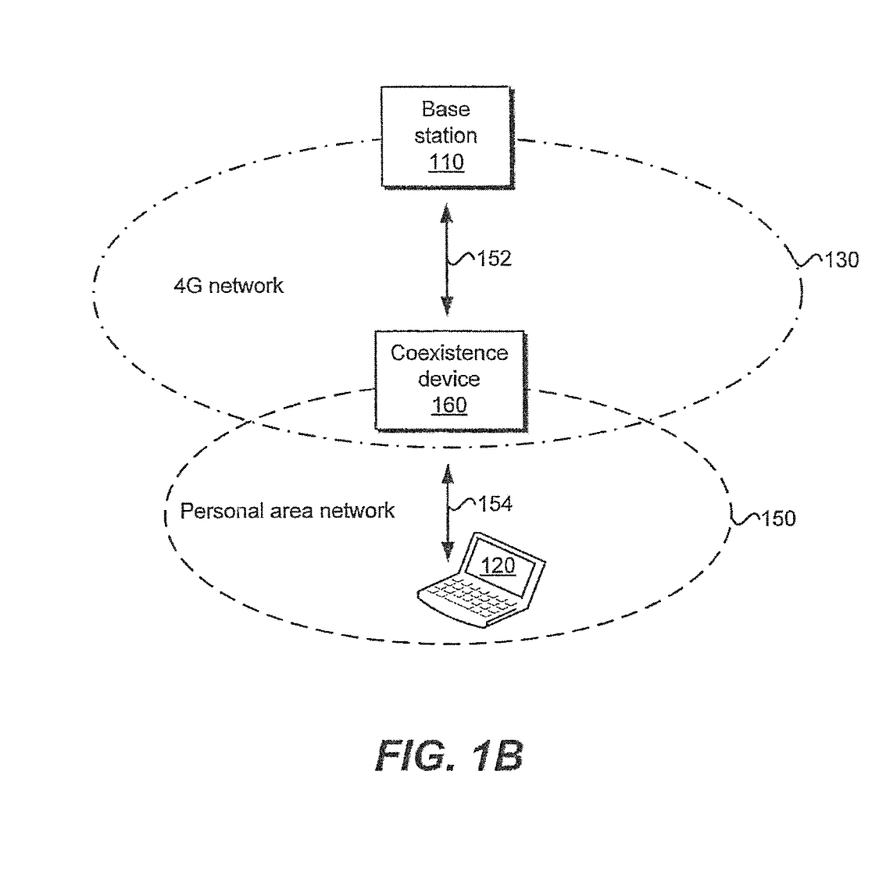
FIG. 1B is a diagram that illustrates an exemplary device that supports communication through a 4G network and a PAN network, in accordance with an embodiment of the invention.

FIG. 1B is a diagram that illustrates an exemplary device that supports communication through a 4G network and a PAN network, in accordance with an embodiment of the invention. Referring to FIG. 1B, there is shown the 4G network 130, the base station 110, the user device 120, a personal area network 150, and a coexistence device 160. The personal area network 150 may support one or more of IrDA, Bluetooth, UWB, Z-Wave, and ZigBee technologies, which may also be supported by the user device 120.

The coexistence device 160 may comprise suitable logic, circuitry, code, and/or interfaces that may be operable to enable traffic between the 4G network 130 and the personal area network 150. In this regard, the coexistence device 160 may be operable to limit and/or reduce the interference that may occur by having 4G and personal area network technologies coexist. In some embodiments of the invention, the coexistence device 160 may be a router such as the router 100 described above. In other embodiments of the invention, the coexistence device 160 may be a mobile computing device, such as a smartphone, for example.

The coexistence device 160 may communicate with the base station 110 through a link 152 that may be substantially similar to the link 132 described above. The coexistence device 160 and the user device 120 may communicate through a link 154 that enables IrDA, Bluetooth, UWB, Z-Wave, and/or ZigBee communication in a downlink direction and/or in an uplink direction. In some instances, the user device 120 may refer to a peripheral device such as a headset and/or printer, for example.

When the personal area network 150 supports Bluetooth and/or ZigBee communication, for example, the traffic in the personal area network 150 and the traffic in the 4G network 130 may be correlated.

Figure 2:
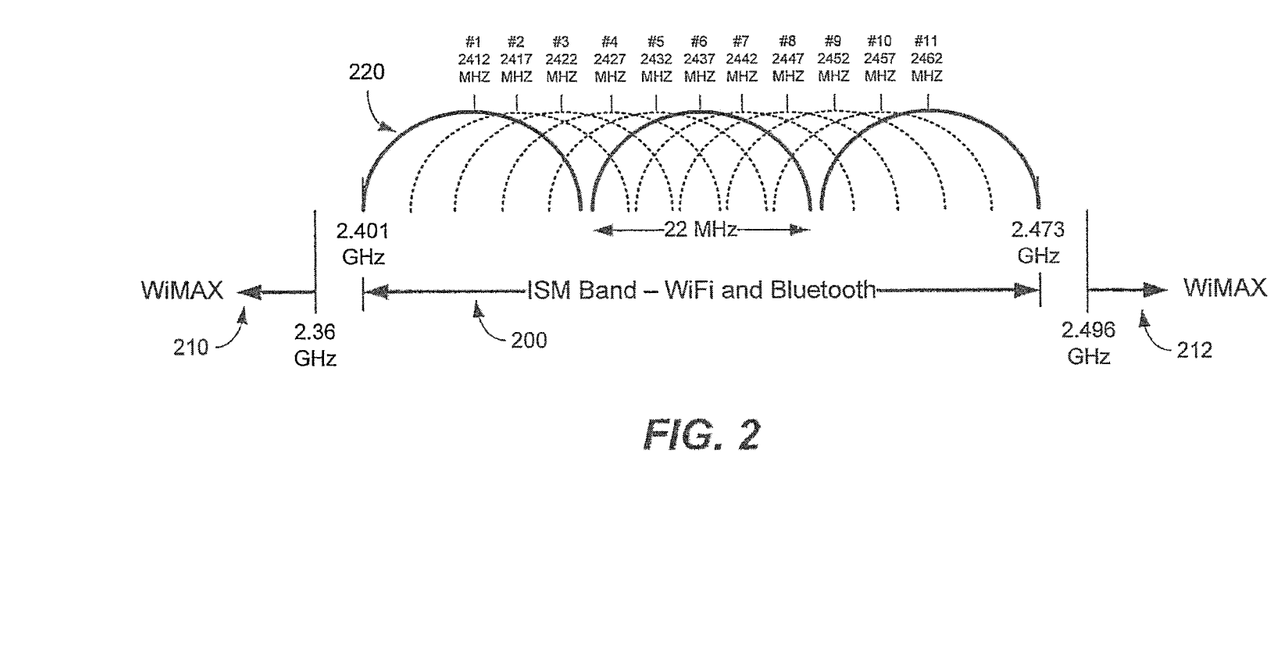
FIG. 2 is a diagram that illustrates WiMAX and WiFi/BT radio spectrum, in connection with an embodiment of the invention.

FIG. 2 is a diagram that illustrates WiMAX and WiFi/BT radio spectrum, in connection with an embodiment of the invention. Referring to FIG. 2, there is shown a portion of the radio spectrum 200 that may be utilized for an unlicensed Industrial, Scientific, and Medical (ISM) band. The unlicensed ISM band is positioned between portions of the radio spectrum 210 and 212 that may be utilized for WiMAX communication. For example, the unlicensed ISM band may comprise those frequencies between 2.401 GHz and 2.473 GHz, while frequencies above 2.496 GHz and below 2.36 GHz may be utilized for WiMAX communication. In some instances, the same portion of the radio spectrum utilized for WiMAX communication may support LTE communication.

The frequencies in the unlicensed ISM band may be utilized for WiFi and/or Bluetooth communication. For WiFi applications in North America, 11 different channels 220, each having a 22 MHz bandwidth, may be utilized as shown in FIG. 2. Bluetooth comprises 79 channels in the ISM band, each channel having a 1 MHz bandwidth. Bluetooth channel hopping operates at a rate of 1600 times per second.

The close frequency separation that exists between the WiMAX radio spectrum and the unlicensed ISM band may result in mutual interference among wireless technologies that utilize such close frequencies. Accordingly, a router, such as the router 100 described above with respect to FIG. 1A, may need to enable operations that limit and/or reduce interference.

In accordance with an embodiment of the invention, the router 100 may perform a time domain approach to 4G and WiFi coexistence to limit and/or reduce interference by enabling and/or disabling WiFi communication based on information received through one or more WiMAX and/or LTE frames. Similarly, the coexistence device 160 may perform a time domain approach to 4G and Bluetooth coexistence to limit and/or reduce interference by enabling and/or disabling Bluetooth communication based on information received through one or more WiMAX and/or LTE frames.

Figure 3A:
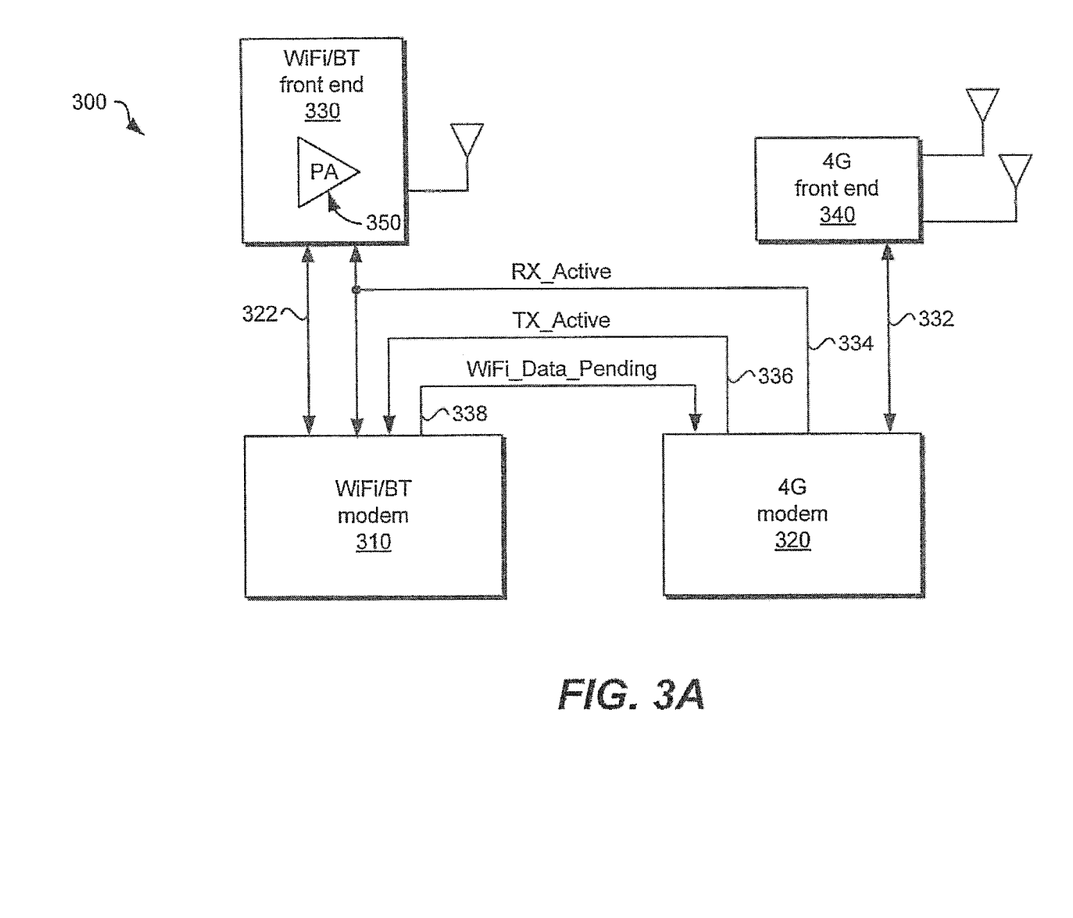
FIGS. 3A-3C are block diagrams of exemplary 4G and WiFi/BT coexistence systems, in accordance with embodiments of the invention.
Figure 3B:
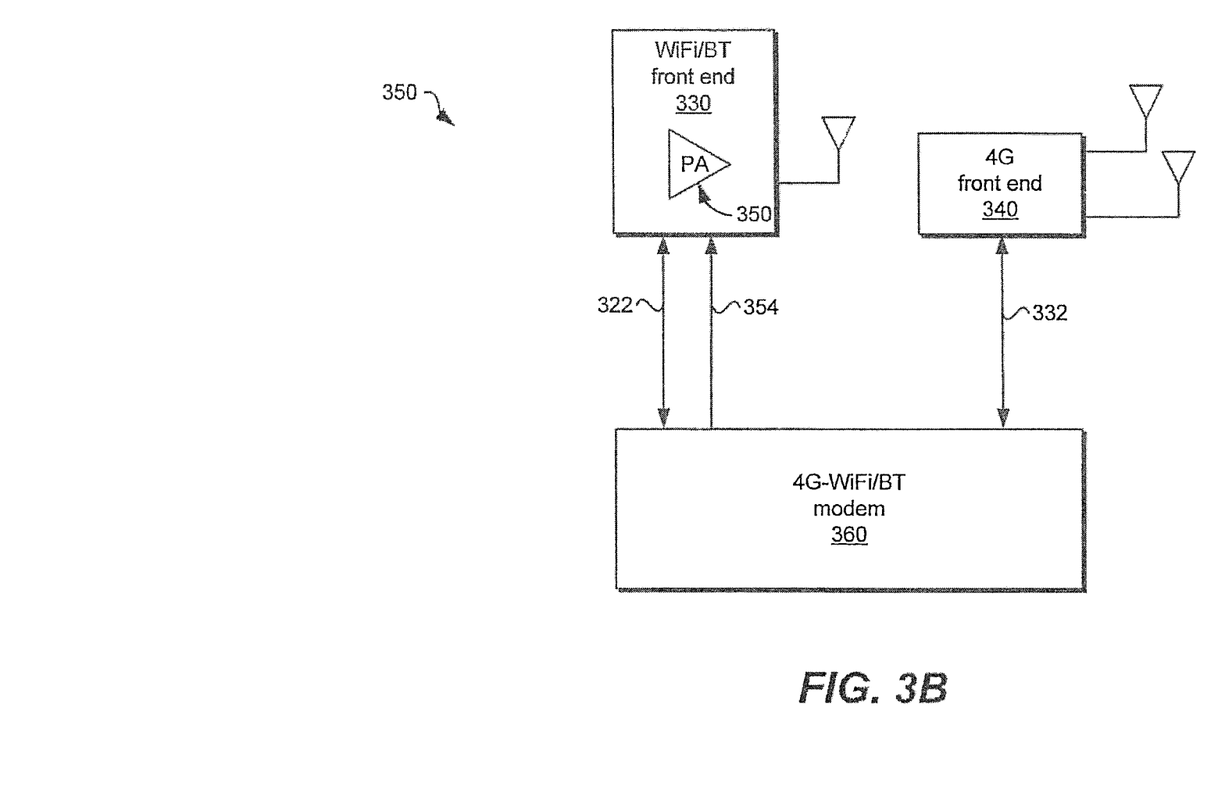

FIGS. 3A-3B are block diagrams of exemplary 4G and WiFi/BT coexistence systems, in accordance with embodiments of the invention. Referring to FIG. 3A, there is shown a 4G and WiFi/BT coexistence system 300 that may comprise a WiFi/BT modem 310, a 4G modem 320, a WiFi/BT front end 330, and a 4G front end 340. In some embodiments of the invention, the various components shown in FIG. 3A may be implemented in the router 100, in the coexistence device 160, or in other like device.

The WiFi/BT modem 310 may comprise suitable logic, circuitry, code, and/or interfaces that may operable to handle WiFi and/or Bluetooth communication. In this regard, the WiFi/BT modem 310 may be operable to process data, control signals, and/or other information associated with WiFi and/or Bluetooth communication. In some embodiments of the invention, the WiFi/BT modem 310 may be operable to perform routing operations. The WiFi/BT modem 310 may be implemented as an integrated circuit having a single substrate and disposed in a single package. In some embodiments of the invention, the WiFi/BT modem 310 may support only one of WiFi communication and Bluetooth communication. In other embodiments of the invention, the WiFi/BT modem 310 may support both of WiFi communication and Bluetooth communication.

The WiFi/BT modem 310 may be operable to receive uplink traffic from a user device, such as the user device 120, for example. The uplink traffic may be received by the WiFi/BT modem 310 through the WiFi/BT front end 330 and signals 322. The WiFi/BT modem 310 may communicate the uplink traffic to the 4G modem 320 when such traffic is intended to be communicated to the base station 110. The transfer of the uplink traffic between the two modems may occur via one or more buses (not shown) that may be controlled by one or more processors (not shown) using information such as queue depths, delay, and/or throughput.

The WiFi/BT modem 310 may be operable to receive downlink traffic from the 4G modem 320. Such downlink traffic may have been received by the 4G modem 320 from the base station 110, for example, and may be intended for the user device 120. The transfer of the downlink traffic between the two modems may occur via one or more buses (not shown) that may be controlled by one or more processors (not shown) using information such as queue depths, delay, and/or throughput. The downlink traffic may be communicated to the user device 120 through the WiFi/BT front end 330 and signals 322.

The 4G modem 320 may comprise suitable logic, circuitry, code, and/or interfaces that may operable to handle 4G communication such as WiMAX communication and/or LTE communication, for example. In this regard, the 4G modem 320 may be operable to process data, control signals, and/or other information associated with WiMAX communication and/or LTE communication. In some embodiments of the invention, the 4G modem 320 may be operable to perform routing operations. The 4G modem 320 may be implemented as an integrated circuit having a single substrate and disposed in a single package.

The 4G modem 320 may be operable to receive downlink traffic from a base station, such as the base station 110, for example. The downlink traffic may be received by the 4G modem 320 through the 4G front end 340 and signals 332. The 4G modem 320 may communicate the downlink traffic to the WiFi/BT modem 310 when such traffic is intended to be communicated to the user device 120. The transfer of the downlink traffic between the two modems may occur via one or more buses (not shown) that may be controlled by one or more processors (not shown) using information such as queue depths, delay, and/or throughput.

The 4G modem 320 may be operable to receive uplink traffic from the WiFi/BT modem 310. Such uplink traffic may have been received by the WiFi/BT modem 310 from the user device 120, for example, and may be intended for the base station 110. The transfer of the uplink traffic between the two modems may occur via one or more buses (not shown) that may be controlled by one or more processors (not shown) using information such as queue depths, delay, and/or throughput. The uplink traffic may be communicated to the base station 110 through the 4G front end 340 and signals 332.

The WiFi/BT front end 330 may comprise suitable logic, circuitry, code, and/or interfaces that may be operable to transmit and/or receive WiFi and/or Bluetooth signals over the unlicensed ISM band. The WiFi/BT front end 330 may be operable to perform various operations on WiFi and/or Bluetooth signals such as filtering, amplifying, mixing, upconverting, and/or downconverting, for example.

The 4G front end 340 may comprise suitable logic, circuitry, code, and/or interfaces that may be operable to transmit and/or receive 4G signals in portions of the radio spectrum that are near the unlicensed ISM band. The 4G front end 340 may be operable to perform various operations on 4G signals such as filtering, amplifying, mixing, upconverting, and/or downconverting, for example. The 4G front end 340 may be operable to perform multiple-input-multiple-output (MIMO) operations associated with the transmission and/or reception of 4G signals. In this regard, the 4G front end 340 may utilize multiple antennas for carrying out the MIMO operations.

In operation, the 4G and WiFi/BT coexistence system 300 may utilize a time domain approach to limit and/or reduce interference in 4G and WiFi coexistence by enabling and/or disabling WiFi communication based on information received through one or more WiMAX and/or LTE frames. Similarly, the 4G and WiFi/BT coexistence system 300 may utilize a time domain approach to limit and/or reduce interference in 4G and Bluetooth coexistence by enabling and/or disabling Bluetooth communication based on information received through one or more WiMAX and/or LTE frames.

FIG. 3A also shows a high-level discrete signaling mechanism between the 4G modem 320 and the WiFi/BT modem 310 that may be utilized to limit and/or reduce interference in the 4G and WiFi/BT coexistence system 300. The signaling mechanism shown in FIG. 3A is based on a 3-wire interface, however, fewer or more wires and/or signals may also be utilized to implement the signaling mechanism.

A signal 334, RX_Active, may be asserted by the 4G modem 320 and the asserted signal may be communicated to the WiFi/BT modem 310 to indicate that the 4G modem 320 is receiving information and that the WiFi/BT modem 310 is to stop or terminate any WiFi and/or Bluetooth transmissions and/or related baseband processing. The asserted RX_Active signal 334 may also be communicated to the WiFi/BT front end 330 to disable a power amplifier (PA) 350. By disabling both the baseband processing and the PA 350 through the asserted RX_Active signal 334, the 4G modem 320 may receive 4G signals without the likelihood of interference from WiFi and/or BT transmissions. Additional information regarding the RX_Active signal 334 is provided below with respect to FIG. 4.

A signal 336, TX_Active, may be asserted by the 4G modem 320 and the asserted signal may be communicated to the WiFi/BT modem 310 to indicate that the 4G modem 320 is transmitting information and that the WiFi/BT modem 310 may transmit or receive WiFi and/or Bluetooth signals. The TX_Active signal 336 may be utilized by the WiFi/BT modem 310 in connection with a CCA operation in WiFi to determine that the energy that is being detected by the WiFi/BT modem 310 in the physical medium is associated with the 4G transmission and not with some other source. By having knowledge that the energy being detected is from the 4G modem 320, the WiFi/BT modem 310 need not limit its operation when such energy is detected. Additional information regarding the TX_Active signal 336 is provided below with respect to FIG. 4.

A signal 338, WiFi_Data_Pending, may be asserted by the WiFi/BT modem 310 and the asserted signal may be communicated to the 4G modem 320 to indicate that there is a backup in WiFi and/or Bluetooth transmissions. The 4G modem 320 may utilize this information to modify the bandwidth allocated by the base station to alleviate the pending WiFi transmissions in the WiFi/BT modem 310. Additional information regarding the WiFi_Data_Pending signal 338 is provided below with respect to FIG. 6.

Referring to FIG. 3B, there is shown a 4G and WiFi/BT coexistence system 350 that may comprise a 4G-WiFi/BT modem 360, the WiFi/BT front end 330, and the 4G front end 340. In some embodiments of the invention, the various components shown in FIG. 3B may be implemented in the router 100, in the coexistence device 160, or other like device.

The 4G-WiFi/BT modem 360 may be operable to perform the operations of the WiFi/BT modem 310 and of the 4G modem 320 described above. In addition, the functionality and/or operation associated with high-level discrete signaling mechanism described above may be implemented within the 4G-WiFi/BT modem 360. In this regard, transmit and/or receive buffer information may be utilized by the 4G-WiFi/BT modem 360 to generate the appropriate signaling and/or equivalent functionality to limit interference between 4G and WiFi communications and/or between 4G and Bluetooth communications. Part of the signaling operation may comprise generating a signal 354 to disable the PA 350 in the WiFi/BT front end 330 when appropriate. The 4G-WiFi/BT modem 360 may be implemented as an integrated circuit having a single substrate and disposed in a single package. In some embodiments of the invention, the 4G-WiFi/BT modem 360 may support only one of WiFi communication and Bluetooth communication. In other embodiments of the invention, the 4G-WiFi/BT modem 360 may support both of WiFi communication and Bluetooth communication.

Figure 3C:
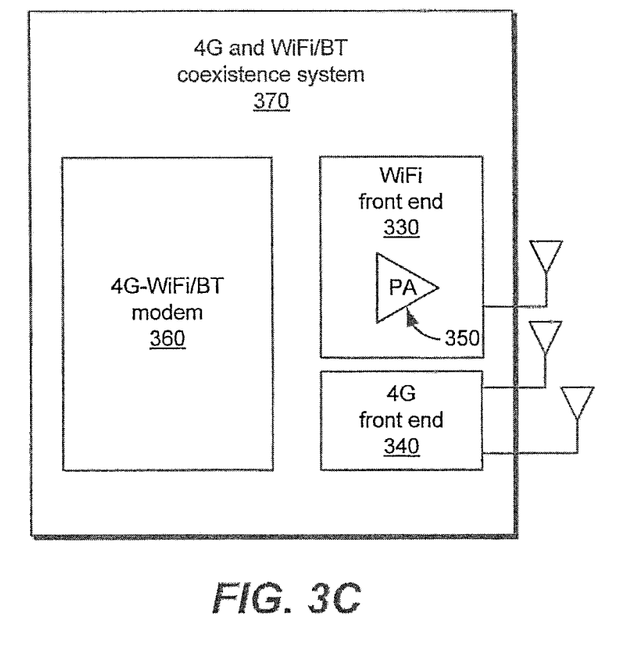

Referring to FIG. 3C, there is shown a 4G and WiFi/BT coexistence system 370 that may comprise the 4G-WiFi/BT modem 360, the WiFi/BT front end 330, and the 4G front end 340. In some embodiments of the invention, the 4G and WiFi/BT coexistence system 370 shown in FIG. 3C may be implemented in the router 100, in the coexistence device 160, or other like device. The 4G and WiFi/BT coexistence system 370 may be implemented as an integrated circuit having a single substrate and disposed in a single package.

Figure 4:
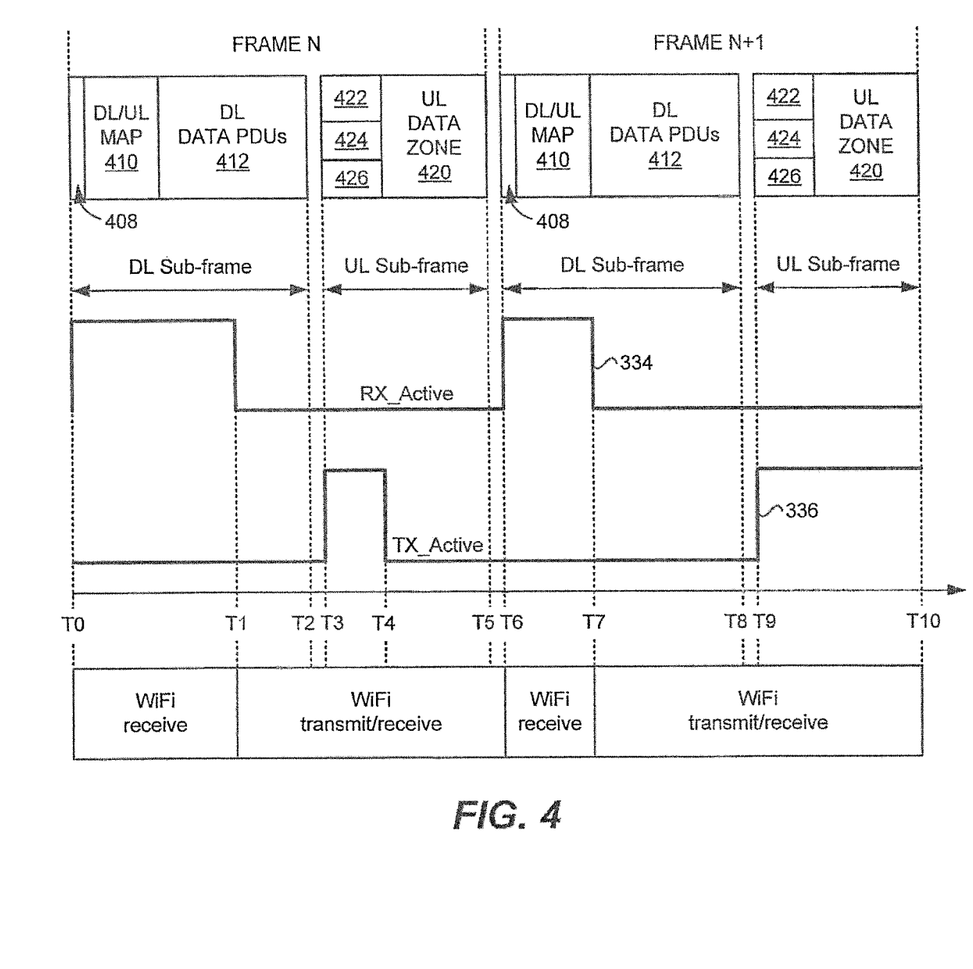
FIG. 4 is a diagram that illustrates an exemplary time domain approach to 4G and WiFi/BT coexistence, in accordance with an embodiment of the invention.

FIG. 4 is a diagram that illustrates an exemplary time domain approach to 4G and WiFi/BT coexistence, in accordance with an embodiment of the invention. Referring to FIG. 4, there are shown two consecutive WiMAX frames, Frame N and Frame N+1, which may be associated with WiMAX communication in a system such as the 4G and WiFi/BT coexistence system 300, for example.

The first frame, Frame N, may comprise a downlink (DL) sub-frame and an uplink (UL) sub-frame. The second frame, Frame N+1, may also comprise a DL sub-frame and a UL sub-frame. The DL sub-frames in both frames may have a substantially similar structure. The UL sub-frames in both frames may also have a substantially similar structure. For example, both DL sub-frames may comprise 29 symbols and have a duration of about 3 milliseconds (ms). The DL sub-frames may comprise a preamble 408, downlink and uplink (DL/UL) medium access protocol (MAP) information 410, and DL data protocol data units (PDUs) 412. The DL data PDUs 412 may be structured to support multiple downlink data bursts. The MAP information may comprise a downlink burst profile, an uplink burst profile, and one or more physical layer control messages.

Both UL sub-frames may comprise 18 symbols and may have a duration of about 2 ms. The UL sub-frames may comprise ranging information 422, Channel Quality Indicator Channel (CQICH) information 424, Hybrid Automatic Repeat Request (HARQ) information 426, and an UL data zone 420. The UL data zone 420 may be structured to support multiple uplink data bursts.

In operation, the 4G modem 320 in the 4G and WiFi/BT coexistence system 300 may begin processing the DL sub-frame of Frame N. In this regard, the RX_Active signal 334 may be asserted by the 4G modem 320 at the start of the DL sub-frame processing, that is, at time instant T0. The 4G modem 320 may determine, based on the downlink MAP information in the DL/UL MAP information 410, whether there is any data that needs to be decoded in the DL data PDUs 412. In this example, data is available to be decoded and the 4G modem 320 maintains the RX_Active signal 334 asserted until the decoding is completed at time instant T1. While the DL sub-frame of Frame N ends at time instant T2, the RX_Active signal 334 is maintained deasserted by the 4G modem 320 until the start of the DL sub-frame of Frame N+1 at time instant T6.

In response to the assertion of the RX_Active signal 334 by the 4G modem 320, the WiFi/BT modem 310 in the 4G and WiFi coexistence system 300 may not transmit WiFi between time instants T0 and T1. Once the RX_Active signal 334 is deasserted, the WiFi/BT modem 310 may transmit and/or receive WiFi until time instant T6.

At time instant T3, the 4G modem 320 may begin processing the UL sub-frame of Frame N. In this regard, the TX_Active signal 336 may be asserted by the 4G modem 320 at the start of the UL sub-frame processing. The 4G modem 320 may determine, based on the uplink MAP information in the DL/UL MAP information 410, whether there is any data that needs to be decoded in the UL data zone 420. In this example, no data is available to be decoded and the 4G modem 320 maintains the TX_Active signal 336 asserted until the processing of control information is completed at time instant T4. While the UL sub-frame of Frame N ends at time instant T5, the TX_Active signal 336 is maintained deasserted by the 4G modem 320 until the start of the UL sub-frame of Frame N+1 at time instant T9.

In response to the assertion of the TX_Active signal 336 by the 4G modem 320 during time instants T3 and T4, the WiFi/BT modem 310 may determine, in connection with a CCA operation, that the energy detected in the physical medium is that of the WiMAX transmission and that the physical medium may be available for WiFi communication.

At time instant T6, the 4G modem 320 may begin processing the DL sub-frame of Frame N+1. In this regard, the RX_Active signal 334 may be asserted by the 4G modem 320 at the start of the DL sub-frame processing. The 4G modem 320 may determine, based on the downlink MAP information in the DL/UL MAP information 410, whether there is any data that needs to be decoded in the DL data PDUs 412. In this example, there is no data that needs to be decoded and the 4G modem 320 maintains the RX_Active signal 334 asserted until the reading of the DL/UL MAP information 410 is completed at time instant T7. While the DL sub-frame of Frame N ends at time instant T8, the RX_Active signal 334 is maintained deasserted by the 4G modem 320 until the end of the UL sub-frame of Frame N+1 at time instant T10.

In response to the assertion of the RX_Active signal 334 by the 4G modem 320, the WiFi/BT modem 310 may not transmit WiFi between time instants T6 and T7. Once the RX_Active signal 334 is deasserted, the WiFi/BT modem 310 may transmit and/or receive WiFi until time instant T10.

At time instant T8, the 4G modem 320 may begin processing the UL sub-frame of Frame N+1. In this regard, the TX_Active signal 336 may be asserted by the 4G modem 320 at the start of the UL sub-frame processing. The 4G modem 320 may determine, based on the uplink MAP information in the DL/UL MAP information 410, whether there is any data that needs to be decoded in the UL data zone 420. In this example, there is data available to be decoded and the 4G modem 320 maintains the TX_Active signal 336 asserted until the data decoding is completed at time instant T10.

In response to the assertion of the TX_Active signal 336 by the 4G modem 320 during time instants T9 and T10, the WiFi/BT modem 310 may determine, in connection with a CCA operation, that the energy detected in the physical medium is that of the WiMAX transmission and that the physical medium may be available for WiFi communication.

While the time domain approach to 4G and WiFi/BT coexistence in FIG. 4 is described in connection with WiMAX communication, the invention need not be so limited. For example, a similar approach may be utilized when TDD-LTE is utilized for 4G communication. In such instances, processing of the DL sub-frames and the UL sub-frames may determine when to assert and deassert the RX_Active signal 334 and/or the TX_Active signal 336, for example. A similar approach may also be utilized when the 4G communication is based on FDD-LTE.

While the time domain approach to 4G and WiFi/BT coexistence in FIG. 4 is described in connection with the high-level discrete signaling mechanism of FIG. 3A, the invention need not be so limited. For example, a similar mechanism or other signaling mechanisms may be utilized to provide the functionality achieved by the high-level discrete signaling mechanism of FIG. 3A.

In addition, while the time domain approach to 4G and WiFi/B coexistence in FIG. 4 is described in connection with the 4G and WiFi/BT coexistence system 300 in FIG. 3A, the invention need not be so limited. For example, a similar approach may be implemented in the 4G and WiFi/BT coexistence system 350 shown in FIG. 3B and in the 4G and WiFi/BT coexistence system 370 shown in FIG. 3C.

Moreover, while the time domain approach to 4G and WiFi/BT coexistence in FIG. 4 applies to 4G and Bluetooth coexistence, it may also apply to 4G and ZigBee coexistence, for example.

Figure 5:
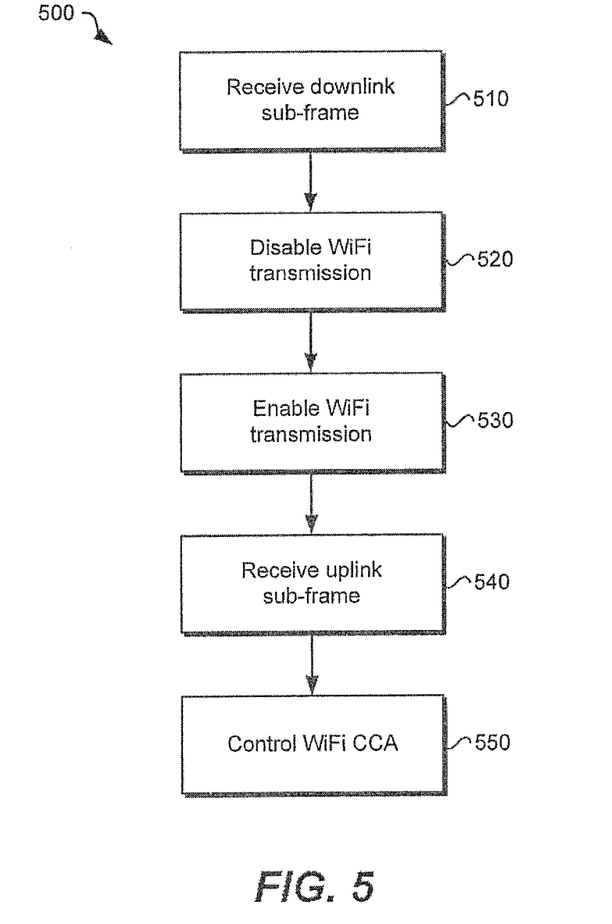
FIG. 5 is a flow diagram that illustrates exemplary steps for a time domain approach to 4G and WiFi/BT coexistence, in accordance with an embodiment of the invention.

FIG. 5 is a flow diagram that illustrates exemplary steps for a time domain approach to 4G and WiFi/BT coexistence, in accordance with an embodiment of the invention. Referring to FIG. 5, there is shown a flow chart 500 in which, at step 510, a 4G modem or other like device may receive a 4G downlink sub-frame. The 4G downlink sub-frame may be associated with WiMAX communication, with TDD-LTE communication, and/or with FDD-LTE, for example. The 4G modem may be, for example, one of the modems that support 4G communication as described above with respect to the 4G and WiFi/BT coexistence systems 300, 350, and 370.

At step 520, the 4G modem may disable WiFi transmission in a WiFi modem based on information in the 4G downlink sub-frame. For example, WiFi transmission may be disabled until the decoding of data in the 4G downlink sub-frame is completed. The WiFi transmission may be disabled by asserting a signal such as the RX_Active signal 334, for example. The WiFi modem may be, for example, one of the modems that support WiFi communication as described above with respect to the 4G and WiFi/BT coexistence systems 300, 350, and 370. The disabling of the WiFi transmission may comprise disabling baseband operations in the WiFi modem and/or disabling a power amplifier in a WiFi front end such as the WiFi/BT front end 330.

At step 530, the 4G modem may enable the previously disabled WiFi transmission once the decoding of data in the 4G downlink sub-frame is completed. At step 540, a 4G uplink sub-frame may be received next by the 4G modem. The WiFi transmission may remain enabled during the 4G uplink sub-frame received by the 4G modem at step 540.

At step 550, the 4G modem may transmit for at least a portion of the 4G uplink sub-frame and may provide an indication to the WiFi modem of the duration of such transmission. The WiFi modem may utilize such information in carrying out CCA operations to determine whether energy detected in the medium is from the 4G transmission or from some other source.

Figure 6:
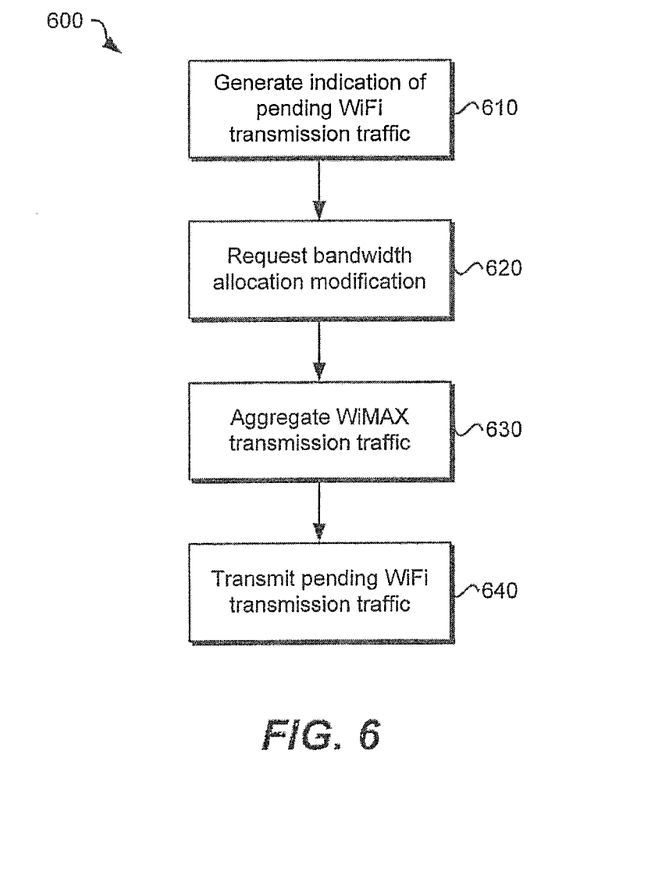
FIG. 6 is a flow diagram that illustrates exemplary steps to aggregate uplink transmissions in a 4G and WiFi/BT coexistence system, in accordance with an embodiment of the invention.

FIG. 6 is a flow diagram that illustrates exemplary steps to aggregate uplink transmissions in a 4G and WiFi/BT coexistence system, in accordance with an embodiment of the invention. Referring to FIG. 6, there is shown a flow chart 600 in which, at step 610, a WiFi modem or other like device may generate an indication of pending WiFi transmission traffic and may send the indication to a 4G modem. The WiFi modem may be, for example, one of the modems that support WiFi communication as described above with respect to the 4G and WiFi/BT coexistence systems 300, 350, and 370. Similarly, the 4G modem may be, for example, one of the modems that support 4G communication as described above with respect to the 4G and WiFi/BT coexistence systems 300, 350, and 370. The indication may be, for example, the WiFi_Data_Pending signal 338 described with respect to FIG. 3A.

At step 620, the 4G modem, in response to such indication, may request from a base station that the bandwidth allocation be modified to enable WiMAX communication through bursts of data. At step 630, based on the bandwidth allocation received from the base station, the 4G modem may aggregate WiMAX transmission so that transmission occurs every N frames, for example. Fewer instances of WiMAX transmission may result in reduced WiFi interference that may allow the WiFi modem to address the backup in WiFi transmissions. At step 640, the WiFi modem may begin to transmit some or all of the pending traffic.

Figure 7:
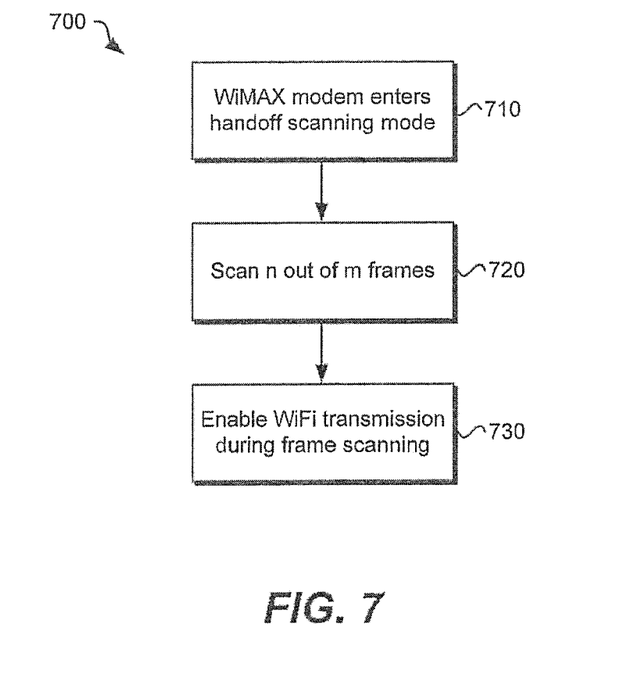
FIG. 7 is a flow diagram that illustrates exemplary steps during WiMAX handoff scanning in a 4G and WiFi/BT coexistence system, in accordance with an embodiment of the invention.

FIG. 7 is a flow diagram that illustrates exemplary steps during WiMAX handoff scanning in a 4G and WiFi/BT coexistence system, in accordance with an embodiment of the invention. Referring to FIG. 7, there is shown a flow chart 700 in which, at step 710, a 4G modem or other like device may enter into a handoff scanning mode. The 4G modem may be, for example, one of the modems that support 4G communication as described above with respect to the 4G and WiFi/BT coexistence systems 300, 350, and 370. In such scenario, signals from a current base station may be already weak in relation to scan thresholds and disabling a WiFi modem during handoff scanning may not be necessary. The WiFi modem may be, for example, one of the modems that support WiFi communication as described above with respect to the 4G and WiFi/BT coexistence systems 300, 350, and 370.

At step 720, the 4G modem may scan N out of M frames received. In this regard, the 4G modem may utilize at least the first 2 symbols received in each of the N frames scanned. In some embodiments of the invention, N=2 and M=20. At step 730, during frame scanning, the 4G modem may indicate to a WiFi modem to disregard any indication to disable WiFi transmission. When the 4G modem generates a signal such as the RX_Active signal 334, and when such signal is asserted on the WiFi modem during frame scanning, the 4G modem may generate some other indication to the WiFi modem to disregard the disabling of the WiFi transmission indicated by the RX_Active signal 334. In some embodiments of the invention, the 4G modem may deassert the RX_Active signal 334 during frame scanning.

The various steps described above with respect to FIGS. 5, 6, and 7 may be applied to those instances in which Bluetooth communication is utilized instead of WiFi communication in coexistence with 4G communication.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for a time domain approach to 4G WiMAX/LTE and WiFi coexistence.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
receiving downlink medium access protocol (MAP) information in a downlink sub-frame of a first wireless protocol;
disabling a transmission of a second wireless protocol during a portion of the downlink sub-frame of the first wireless protocol based on the received downlink MAP information;
enabling the disabled transmission of the second wireless protocol upon conclusion of decoding of available data within the downlink sub-frame of the first wireless protocol;
receiving uplink MAP information in the downlink sub-frame of the first wireless protocol;
generating a signal during an uplink sub-frame of the first wireless protocol based on the received uplink MAP information; and
controlling a clear channel assessment operation associated with the transmission of the second wireless protocol based on the generated signal,
wherein the receiving downlink MAP information, disabling and enabling are performed by a wireless communications device to thereby reduce interference between the first wireless protocol and the second wireless protocol.

2. The method of claim 1, wherein the first wireless protocol is one of Long Term Evolution (LTE), LTE Advanced, Worldwide Interoperability for Microwave Access (WiMAX) and. Wireless MAN-Advanced, and the second wireless protocol is one of WiFi and Bluetooth.

3. The method of claim 1, wherein the first wireless protocol is a fourth generation (4G) protocol and the second wireless protocol is one of WiFi and Bluetooth.

4. The method of claim 1, wherein the downlink MAP information comprises a downlink burst profile and one or more physical layer control messages.

5. The method of claim 1, wherein the receiving uplink MAP information includes receiving an uplink burst profile and one or more physical layer control messages.

6. The method of claim 1, wherein the disabling transmission of the second wireless protocol includes asserting, by a device associated with the first wireless protocol, an active receiver signal to a device associated with the second wireless protocol to thereby disable the second wireless protocol, the active receiver signal indicating the receiving downlink MAP information in the downlink sub-frame of the first wireless protocol.

7. The method of claim 1, further comprising:
generating an indication of pending transmission traffic of the second wireless protocol;
requesting bandwidth allocation modification of the first wireless protocol to a base station based on the generated indication; and
if an indication is received that the requested bandwidth allocation modification is granted, aggregating uplink transmission traffic of the first wireless protocol in accordance with a schedule associated with the granted requested bandwidth allocation modification so that transmission in the first wireless protocol occurs every N frames, wherein N is an integer.

8. The method of claim 1, further comprising:
receiving the downlink MAP information in the downlink sub-frame of a next frame of the first wireless protocol, the next frame being a frame consecutive to a frame that includes the downlink sub-frame of the first wireless protocol; and disabling transmission of the second wireless protocol during a portion of the downlink sub-frame of the next frame of the first wireless protocol based on the received downlink MAP information in the downlink sub-frame of the next frame of the first wireless protocol.

9. The method of claim 1, wherein the disabling of the transmission of the second wireless protocol includes:
disabling a baseband operation associated with the transmission of the second wireless protocol and a radio frequency power amplifier associated with the transmission of the second wireless protocol.

10. A communications device comprising:
a first modem configured to receive downlink medium access protocol (MAP) information in a downlink sub-frame of a first wireless protocol; and
a second modem configured to disable a transmission of a second wireless protocol during, a portion of the downlink sub-frame of the first wireless protocol based on the received downlink MAP information from the first modem, and to enable the disabled transmission of the second wireless protocol upon conclusion of decoding of available data within the downlink sub-frame of the first wireless protocol,
wherein the first modem is further configured to:
receive uplink MAP information in the downlink sub-frame of the first wireless protocol, and
generate a signal during an uplink sub-frame of the first wireless protocol based on the received uplink MAP information; and
wherein the second modem is further configured to:
control a clear channel assessment operation associated with the transmission of the second wireless protocol based on the generated signal from the first modem.

11. The communications device of claim 10, wherein the first wireless protocol is one of Long Term Evolution (LTE), LTE Advanced, Worldwide Interoperability for Microwave Access (WiMAX) and Wireless MAN-Advanced, and the second wireless protocol is one of WiFi and Bluetooth.

12. The communications device of claim 10, wherein the first wireless protocol is a fourth generation (4G) protocol and the second wireless protocol is one of WiFi and Bluetooth.

13. The communications device of claim 10, wherein the downlink MAP information comprises a downlink burst profile and one or more physical layer control messages.

14. The communications device of claim 10, wherein the uplink MAP information comprises an uplink burst profile and one or more physical layer control messages.

15. The communications device of claim 10, wherein the first modem is further configured to assert an active receiver signal at the second modem to thereby disable transmission of the second wireless protocol, the active receiver signal indicating the receiving of the downlink MAP information in the downlink sub-frame of the first wireless protocol.

16. The communications device of claim 10,
wherein the second modem is further configured to:
generate an indication of pending transmission traffic of the second wireless protocol; and
wherein the first modem is further configured to:
request bandwidth allocation modification of the first wireless protocol to a base station based on the generated indication from the second modem; and
if an indication is received from the base station that the requested bandwidth allocation modification is granted, aggregate uplink transmission traffic of the first wireless protocol in accordance with a schedule associated with the granted requested bandwidth allocation modification so that transmission in the first wireless protocol occurs every N frames, wherein N is an integer.

17. The communications device of claim 10,
wherein the first modem is further configured to:
receive the downlink MAP information in the downlink sub-frame of a next frame of the first wireless protocol, the next frame being a frame consecutive to a frame that includes the downlink sub-frame of the first wireless protocol; and
wherein the second modem is further configured to:
disable transmission of the second wireless protocol during a portion of the downlink sub-frame of the next frame of the first wireless protocol based on the received downlink MAP information in the downlink sub-frame of the next frame of the first wireless protocol from the first modem.

18. The communications device of claim 10, wherein the second modem is further configured to:
disable a baseband operation associated with the transmission of the second wireless protocol and disable a radio frequency power amplifier associated with the transmission of the second wireless protocol.

* * * * *

UNITED STATES PATENT AND TRADEMARK OFFICE
CERTIFICATE OF CORRECTION

PATENT NO. : 9,929,849 B2
APPLICATION NO. : 14/672861
DATED : March 27, 2018
INVENTOR(S) : Kameswara Rao Medapalli Page 1 of 1

It is certified that error appears in the above-identified patent and that said Letters Patent is hereby corrected as shown below:

In Column 12, Line 30, replace "and. Wireless" with --and Wireless--.
    In Column 13, Line 18, replace "during, a" with --during a--.
    In Column 13, Line 31, replace "modern" with --modem--.
    In Column 14, Line 14, replace "modern" with --modem--.
    In Column 14, Line 41, replace "modern" with --modem--.

Signed and Sealed this
Thirtieth Day of October, 2018

Andrei Iancu
*Director of the United States Patent and Trademark Office*